UNITED STATES PATENT OFFICE 2,208,029

GAS PURIFICATION

Eugene M. Heckman, Bellevue, Pa.

No Drawing. Application August 7, 1937,
Serial No. 157,849

4 Claims. (Cl. 252—2.5)

This invention relates to the preparation of a composition for removing hydrogen sulphide from commercially valuable gas, such as natural gas, coal gas, water gas, and the like, and to the use of the gas-purifying composition.

It is well known that the presence of hydrogen sulphide imparts such objectionable qualities to otherwise valuable gas as at least greatly to reduce its commercial value. Various methods of purifying gas of hydrogen sulphide have been employed, and various materials have been employed for the purpose. A prominent material for this purpose has been ferric oxide, preferably in the form of hydrated ferric oxide.

Hydrated ferric oxide, as is well known, is a material a unit of which of which is able to absorb a relatively great quantity of hydrogen sulphide; that is, it has a high capacity for that gaseous substance, and is to that extent satisfactory in gas purification. It is also regenerative, in that it may be regenerated by passing air through a bed of the material which has become exhausted by the gas purifying operation. A defect of this material is, however, that it is not sufficiently active in removing hydrogen sulphide to provide a wholly effective purifying process of this nature for gases passed through a bed of the material.

One object of my invention is to provide a composition for cleansing useful gases of hydrogen sulphide which so combines adequate capacity and adequate activity as greatly to improve a gas purifying process in which it is used.

Another object of my invention is to provide a composition having both high activity and high capacity which is also susceptible of regeneration.

Another object of my invention is to provide a simple and inexpensive method of producing a gas-purifying composition having the above-noted desirable qualities.

Waste water from coal mines is highly charged with sulphur leached out from the coal. This sulphur, by reaction with air and water, gradually becomes oxidized to sulphuric acid. Iron compounds, picked up by the mine water, are dissolved by this sulphuric acid to form ferrous sulphate (FeSO$_4$).

Formula No. 1

$$H_2SO_4 + Fe \rightarrow FeSO_4 + 2H$$

Under the conditions in which the solution stands, it tends to become increasingly concentrated, and by reaction with calcium carbonate, which is normally present in coal mines, there is a tendency to form a ferrous precipitate in accordance with the formula:

Formula No. 2

$$2FeSO_4.xH_2O + 2CaCO_3 \rightarrow 2FeO.xH_2O + CaSO_4 + CO_2$$

This, by oxidation or contact with free oxygen, reacts probably as follows:

$$4FeO.xH_2O + O_2 \rightarrow 2Fe_2O_3.xH_2O$$

The iron compounds are present in variable quantities, depending upon the mine conditions, so that the mine waste by seasoning usually contains additionally a content of free sulphuric acid and of sesqui-sulphate of iron, produced in accordance with the formula which is concurrent with the reaction of Formula No. 2.

Formula No. 3

$$2FeSO_4.xH_2O + H_2SO_4 \rightarrow Fe_2(SO_4)_3.xH_2O + H_2$$

Precipitation of the iron salts takes place gradually. Under the usual conditions in mines, precipitation occurs over relatively great areas, and the precipitate may be removed either as a relatively solid precipitate or as a thin slurry, as may be most convenient in each particular case. Outside the mine the reactions leading to the precipitation of Fe$_2$O$_3$ and formation of Fe$_2$(SO$_4$)$_3$ occur more rapidly than wthin the mine because of a greater quantity of oxygen in contact with the mine water solution, and because of a greater available quantity of calcium carbonate, or an equivalent reagent.

It should be explained that the reaction by which ferric oxide purifies gases of hydrogen sulphide is one in which sesqui-sulphide of iron (Fe$_2$S$_3$) is formed. Upon exposure to atmospheric oxygen, this sesqui-sulphide of iron is oxidized, to reform iron oxide with the liberation of free sulphur. In a process for cleansing gases of hydrogen sulphide, a treating bed of ferric oxide may therefore be regenerated by discontinuing the passages of the gas to be purified therethrough, and by passing air through the bed for a time sufficient adequately to regenerate ferric oxide by reaction of oxygen with the sesqui-sulphide of iron formed by the purifying reaction.

Theoretically these reactions would give perfect performance in regeneration. As indicated above, however, the ferric oxide does not react with the hydrogen sulphide vigorously enough wholly, or in substantial entirety, to remove the last traces of hydrogen sulphide from a gas passed through a bed of the ferric oxide. While hydrated ferric oxide (Fe$_2$O$_3$ xH$_2$O) is more active than anhydrous ferric oxide (Fe$_2$O$_3$), it is not so active with respect to hydrogen sulphide as to give performance approximating perfection in a gas purifying process.

I have discovered that ferric hydroxide (Fe(OH)₃) possesses high activity in reaction with hydrogen sulphide. This material falls short of perfection as a reagent in removing hydrogen sulphide in that it possesses a lesser capacity for hydrogen sulphide than does ferric oxide, and in that the mechanics of its regeneration are less simple than those which have been found adequate for the regeneration of ferric oxide. The reaction of ferric hydroxide, by which it removes hydrogen sulphide, is probably as follows:

*Formula No. 4*

$$2Fe(OH)_3 + 3H_2S \rightarrow Fe_2S_3 + 6H_2O$$

It will be seen from the above that a regenerating treatment with air, following a purifying treatment of a gas, will produce ferric oxide rather than ferric hydroxide, in accordance with the probable formula:

*Formula No. 5*

$$Fe_2S_3 + 6H_2O + O_3 \rightarrow Fe_2O_3.6H_2O + S_3$$

It has been noted that "sulphur mud," formed by mine water which stands in contact with the atmosphere, contains both ferric oxide and the sesqui-sulphate of iron. I have found this to be also true of certain industrial wastes. It is possible to obtain a composition, or mixed mass, of ferric oxide and ferric hydroxide by reacting the sulphur-containing waste with an hydroxide. For example, I may treat the mine or industrial waste with sodium hydroxide, in probable accordance with the following formula:

*Formula No. 6*

$$Fe_2(SO_4)_3 \cdot xH_2O + 6NaOH \rightarrow$$
$$2Fe(OH)_3 + 3Na_2SO_4 + xH_2O$$

The resultant mixed mass of ferric compounds, when used as a bed through which gases to be cleansed of hydrogen sulphide are passed, has the relatively high capacity of the ferric oxide coupled with the high activity of the ferric hydroxide. It may be stated that in such admixture any addition of ferric hydroxide to a mass, or bed, of ferric oxide proportionally increases the activity of the mass in absorbing hydrogen sulphide. Conversely, any addition of ferric oxide to a mass, or bed, of ferric hydroxide proportionally increases the capacity of the bed to absorb hydrogen sulphide. I prefer to use a mixed mass of these substances which contains a substantial proportion of ferric hydroxide for the average run of gases of the type which contain hydrogen sulphide as an impurity.

If a waste material contains so high a proportion of sesqui-sulphate of iron that a higher proportion of ferric hydroxide than may be desired in the final mass would be produced by reaction of Formula No. 6, some or all that substance may be converted into ferric oxide, by reacting the waste material with a suitably reactive carbonate, in probable accordance with the following formula:

*Formula No. 7*

$$Fe_2(SO_4)_3 \cdot xH_2O + 3Na_2CO_3 \rightarrow$$
$$Fe_2O_3 \cdot xH_2O + 3Na_2SO_4 + 3CO_2$$

In reacting an alkaline reagent of either type with the sulphur-containing waste, I prefer that the alkaline reagent and the material with which it reacts both be in the form of a slurry and that the substances be agitated together.

By reacting sesqui-sulphate of iron with an excess of carbonate, ferric hydroxide can be produced, if it be desired to employ carbonate rather than hydroxide as a reagent. Such reaction proceeds in probable accordance with the following formula:

*Formula No. 8*

$$Fe_2(SO_4)_3 \cdot 7H_2O + 6Na_2CO_3 \rightarrow$$
$$2Fe(OH)_3 + 3Na_2(SO_4) + 6NaHCO_3 + H_2O$$

Again to consider the function of the mixed mass of ferric compounds in use as a treating bed for gas purification, it has been noted that ferric oxide may readily be regenerated from the sesqui-sulphide of iron by passing air through a bed of the sulphide resultant from the gas treatment. In the case of ferric hydroxide the regeneration is not so simple. The reaction with hydrogen sulphide likewise produces the sesqui-sulphide of iron, in probable accordance with the following formula:

*Formula No. 9*

$$2Fe(OH)_3 + 3H_2S \rightarrow Fe_2S_3 + 6H_2O$$

Reaction with oxygen thus regenerates ferric oxide, and not ferric hydroxide. If, however, there be maintained in the treating bed an excess of sodium hydroxide or other reactive hydroxide, such as potassium hydroxide, or calcium hydroxide, or a hydroxyl-forming reagent of adequate basic alkalinity, such as sodium carbonate, the sesqui-sulphide of iron tends to react, with formation of ferric hydroxide, in accordance with the probable formula:

*Formula No. 10*

$$Fe_2S_3 + 6H_2O + 4NaOH + O_2 \rightarrow$$
$$2Fe(OH)_3 + 2NaOH + Na_2SO_4 + S_2 + xH_2O$$

It will be noted that the reaction product of hydrogen sulphide with ferric oxide and the reaction product of hydrogen sulphide with ferric hydroxide are thus subject to regeneration into ferric hydroxide, as well as ferric oxide, in the presence of a hydroxyl reagent. By including in the composition from 10% up to 20% by weight of sodium hydroxide with respect to the mixture of iron compounds, or an equivalent inclusion of basic alkalinity in the form of other hydroxides, or other alkaline reagents, the life of the ferric hydroxide content of a treating bed may be greatly extended.

It is to be emphasized that I produce a composition, or mixed mass of iron compounds, from an industrial waste, namely sulphur mud from coal mines. By treatment of that material, its content of sesqui-sulphate of iron, which has no activity in gas purification, is converted into the highly active ferric hydroxide. It is possible, further, to employ industrial wastes, many of which contain sodium hydroxide or calcium hydroxide, to provide the hydroxyl-containing reagent for that purpose. Thus I may react with the sulphur-containing mine waste, liquid salt from the Bayer alumina process, caustic liquor from the rayon industry and other waste alkaline materials.

Various illustrative formulae have been above given with respect to the productions and use of my gas-purifying composition. While certain of the formulae are probable, and all represent the best obtainable illustration of reactions leading to ultimate results, I do not wish to be held to the accuracy of any formula given. In actual practice, the yellow mud is treated with sufficient quantity of alkaline reagent, or reagents, to turn it definitely red, and is to such degree rendered alkaline that it gives a definite alkaline indication with phenol-phthalein.

In using for alkalinity, waste from the Bayer alumina process, as is my preferred practice, I react 100 lbs. of seasoned sulphur mud with 40 lbs. of the alkaline waste, to effect adequate conversion of the material treated into a condition in which it is preponderantly reactive in removing hydrogen sulphide from gases. This proportioning also provides an excess of hydroxyl, or hydroxyl-forming radicals effectively to protect the ferric hydroxide content of the gas-treating bed.

It is possible in part to short-cut the reactions which occur in the mine waste during seasoning by treating with alkaline reagent copperas ($FeSO_4 \cdot xH_2O$). That reaction, however, requires the use of a far greater quantity of alkaline reagent to produce ferric hydroxide than does the reaction with the sesqui-sulphate of iron.

Instead of using coal mine waste as my starting material, I may, by similarly treating copperas, use the waste solution from pickle baths for steel, in the use of which ferrous sulphate is produced. It may be noted that in using copperas, from any source, to obtain a mixed mass of ferric oxide and ferric hydroxide for gas purification, it is necessary to use about 2.5 times the hydroxide required for the treatment of seasoned coal mine waste. A still greater quantity of carbonate is required for this treatment. For example, I have used for this purpose liquor salt from the Bayer alumina process in approximately equal proportions with ferrous sulphate. It may be noted that the liquor salt from the Bayer process has a basic alkalinity of about 47 as compared to the basic alkalinity of 76 for sodium hydroxide. Taking sodium hydroxide as standard, the ratio of the weight of sodium hydroxide to that of Bayer liquor salt is 2:3, and two parts by weight of sodium hydroxide to three parts by weight of ferrous sulphate is fully adequate for my purpose. Other reagents having basic alkalinity may be used in quantities of the order of two parts by weight of sodium hydroxide to three parts by weight of ferrous sulphate. The proportions given not only result in the formation of a content of ferric hydroxide in the composition, but also result in the production of an excess of basic alkalinity to "protect" the hydroxyl radical in the composition and provide for the regeneration of ferric hydroxide in its described gas-purifying use.

The alkalinity requisite for my purpose preferably used varies in using particular batches of waste sulphur-containing starting materials and waste alkaline materials. This is particularly the case in using seasoned coal mine waste, in which variation in seasoning renders desirable the use of varied quantities of the several available alkaline reagents. A general guide to be followed, is as stated above, to react the iron and sulphur-containing starting material with such quantity of material of given basic alkalinity that a product of definite alkalinity is produced.

Quite obviously other substances, such as bog iron ($Fe_2O_3 \cdot 7H_2O$), flue dust, organic absorbent material, porous clays, charcoal, and the like may be added to my composition of iron compounds without altering the fundamental nature of the composition; and various other modifications in the production and use of my gas-purifying composition are to be taken as contemplated in my invention.

I claim as my invention:

1. The method herein described of producing a gas-purifying composition effective in removing hydrogen sulphide which comprises treating coal mine waste seasoned to the condition of a yellow sulphur mud containing hydrated ferric oxide and sesqui-sulphate of iron under reaction promoting conditions with an alkali metal hydroxide in a quantity and having such available basicity that there is produced a definitely basic product containing both yellow hydrated ferric oxide and red ferric hydroxide and having an overall reddish coloration.

2. The method herein described of producing a gas-purifying composition effective in removing hydrogen sulphide which comprises treating coal mine waste seasoned to the condition of a yellow sulphur mud containing yellow hydrated ferric oxide and sesqui-sulphate of iron under reaction promoting conditions with sodium hydroxide in such quantity that there is produced a definitely basic product containing both yellow hydrated ferric oxide and red ferric hydroxide and having an overall reddish coloration.

3. The method herein described of producing a gas-purifying composition effective in removing hydrogen sulphide which comprises treating coal mine waste seasoned to a yellow sulphur mud containing yellow hydrated ferric oxide and sesquisulphate of iron under reaction promoting conditions with a basic reaction mixture containing sodium hydroxide and sodium carbonate in such quantity that there is produced a definitely basic product containing both yellow hydrated ferric oxide and red ferric hydroxide and having an overall reddish coloration.

4. The method herein described of producing a gas-purifying composition effective in removing hydrogen sulphide which comprises treating coal mine waste seasoned to a yellow sulphur mud containing yellow hydrated ferric oxide and sesqui-sulphate of iron under reaction promoting conditions with a basic reaction mixture containing an alkali metal hydroxide and an alkali metal carbonate having such available basicity and in such quantity that there is produced a definitely basic product containing both yellow hydrated ferric oxide and red ferric hydroxide and having an overall reddish coloration.

EUGENE M. HECKMAN.